(12) United States Patent
Yoshikuni et al.

(10) Patent No.: US 6,854,289 B2
(45) Date of Patent: Feb. 15, 2005

(54) METHOD OF MANUFACTURING GLASS GOBS MOLDED GLASS ARTICLES, AND OPTICAL ELEMENTS

(75) Inventors: Keisuke Yoshikuni, Sagamihara (JP); Youji Touma, Higashikurume (JP); Yoshinori Iguchi, Fussa (JP)

(73) Assignee: Hoya Corporation, Tokyo (JP)

(*) Notice: Subject to any disclaimer, the term of this patent is extended or adjusted under 35 U.S.C. 154(b) by 267 days.

(21) Appl. No.: 10/134,631

(22) Filed: Apr. 30, 2002

(65) Prior Publication Data

US 2003/0000252 A1 Jan. 2, 2003

(30) Foreign Application Priority Data

May 1, 2001 (JP) ........................................ 2001-134092

(51) Int. Cl.⁷ .......................... C03B 23/00; C03B 40/04
(52) U.S. Cl. ..................... 65/64; 65/61; 65/66; 65/127; 65/208
(58) Field of Search ............................... 65/61, 62, 66, 65/123, 126, 127, 207, 208, 211–213, 303, 304

(56) References Cited

U.S. PATENT DOCUMENTS

| | | | | |
|---|---|---|---|---|
| 1,599,790 A | * | 9/1926 | Henry ........................... | 65/122 |
| 2,142,006 A | * | 12/1938 | Schaffer et al. ................ | 65/207 |
| 3,162,522 A | * | 12/1964 | Tingley ........................ | 65/225 |
| 3,214,257 A | * | 10/1965 | Faber ........................... | 65/225 |
| 3,583,110 A | * | 6/1971 | Scott ............................ | 451/41 |
| 3,834,884 A | * | 9/1974 | Kurokawa et al. ............. | 65/229 |
| 3,841,859 A | * | 10/1974 | Becker et al. ................. | 65/207 |
| 3,895,931 A | * | 7/1975 | Hamilton ...................... | 65/207 |
| 4,273,568 A | * | 6/1981 | Scholl et al. .................. | 65/76 |
| 4,704,152 A | * | 11/1987 | Davey ........................... | 65/68 |
| 4,915,720 A | * | 4/1990 | Hirota et al. .................. | 65/64 |
| 5,246,476 A | * | 9/1993 | Yoshimura et al. ............ | 65/29.19 |
| 5,421,849 A | * | 6/1995 | Hirota .......................... | 65/237 |

* cited by examiner

Primary Examiner—Steven P. Griffin
Assistant Examiner—Carlos Lopez
(74) Attorney, Agent, or Firm—Oblon, Spivak, McClelland, Maier & Neustadt, P.C.

(57) ABSTRACT

Methods and a device of manufacturing glass gobs with good productivity without defects in appearance from a glass melt. Glass gobs are manufactured from glass melt gobs by molding and cooling glass melt gobs in glass gob molding parts that are intermittently rotated. In one method, single intermittent rotation period of said glass gob molding part is in a range of 0.1 to 0.25 second, and the single intermittent rotation distance of said glass gob molding part is 0.8–7 cm. The device for molding glass gobs from a continuously flowing glass melt has a turntable intermittently rotated around a rotation axis and glass gob molding molds positioned on said turntable. The glass gob molding mold has multiple glass gob molding parts that receive glass melt on the upper surface thereof and mold the glass melt into glass gobs. The glass gob molding mold is positioned on a turntable so that said glass gob molding parts are disposed at equal intervals around a circumference centered on the rotation axis of the turntable.

16 Claims, 3 Drawing Sheets

METHOD OF MANUFACTURING GLASS GOBS MOLDED GLASS ARTICLES, AND OPTICAL ELEMENTS

TECHNICAL FIELD

The present invention relates to a method of, and device for, manufacturing glass gobs that are suitable preforms for use in press-molding from a glass melt; a method of manufacturing molded glass articles employing such glass gobs as press-molding preforms in which the preform is heated and press-molded; and a method of manufacturing optical elements by grinding and polishing the molded glass articles.

TECHNICAL BACKGROUND

Methods of directly manufacturing high-precision molded glass articles such as lenses by heating a glass preform and molding it in a press to a prescribed shape and methods of manufacturing glass optical elements such as lenses by grinding and polishing molded products are widely employed as techniques permitting the mass production of high-precision glass products such as optical elements with high reproducibility and good production efficiency. In such press-molding methods, press-molding devices, molding conditions and the like vary widely depending on whether grinding and polishing processes are required after press-molding. However, they all have in common the production of a glass preform suited to each press-molding, followed by the reheating and pressing of the preform.

Methods of taking a prescribed quantity of the glass melt and plastically transforming it into molded glass gobs to obtain the above-described glass preform afford good production efficiency because the glass preform can be produced without ever cooling the glass that has been melted. One such example is the method of molding glass gobs employing the device disclosed in Japanese Unexamined Patent Publication (KOKAI) Heisei No. 8-81228. This device sequentially receives a continuously flowing glass melt on multiple receiving molds and molds the glass melt into glass gobs on the receiving molds while the glass melt is still within a temperature range permitting deformation. In this device, multiple receiving molds are provided on a turntable, the turntable is intermittently rotated, and glass gobs are molded consecutively from the glass melt.

Although the above-mentioned method of molding glass gobs is a manufacturing method affording good production efficiency, the following technical background and problems exist.

(1) Since the glass melt is continuously discharged through a flow nozzle, the supplying (referred to hereinafter as "casting") of glass melt to the receiving molds does not work well when time is required to switch out the receiving molds. Accordingly, the time required for one intermittent rotation of the turntable (referred to hereinafter as the "delivery time") is limited.

(2) The cast glass is subjected to acceleration during intermittent rotation of the turntable. This acceleration exerts a force on the glass, deforming the glass. When the amount of deformation is small, the glass returns to a gob shape when the turntable stops. However, when the amount of deformation is significant, distortion remains in the glass after it returns its original shape. This distortion remains in the molded glass gob and in the glass preform employed for press-molding, becoming a defect in the press-molded product. The greater the acceleration exerted on the glass and the greater the weight of the glass, the greater the tendency of the glass to distort.

(3) Since the receiving molds are re-used in the above-described method of molding glass gobs, there is an upper limit to the rotation angle from the position at which casting is conducted to the position at which the glass gob is removed (referred to hereinafter as "takeout"). Since the above-mentioned delivery time is also limited, once the number of times the turntable is intermittently driven in one rotation (called the "section number") has been determined, the time from casting to takeout has also been determined. However, when this time is excessively short, the glass gob is taken out before it has adequately cooled, that is, while it is still deformable. When this happens, the glass gob is deformed during takeout or during delivery process after takeout, the glass gobs stick to each other, and defective product is obtained.

Thus, in methods in which a continuously flowing glass melt is sequentially received by multiple receiving molds and molded into glass gobs by the receiving molds while still at a temperature range at which the glass melt is deformable, the above-described technical background and problems exist. For this reason, problems do not occur when comparatively small glass gobs are produced at slow speed. However, when comparatively large glass gobs are produced, or even when comparatively small glass gobs are produced at rapid speed (with better production efficiency), it is difficult to manufacture a good product.

Accordingly, it is an object of the present invention is to provide a method permitting the manufacturing of glass gobs without defects in appearance from a glass melt, that is, good product with good production efficiency, even when producing comparatively large glass gobs or producing comparatively small glass gobs at high speed (with better production efficiency); and a device for molding glass gobs.

A further object of the present invention is to provide a method of manufacturing molded glass products using the above-mentioned glass gobs as preforms for producing press-molded articles such as lenses or press-molded articles that are made into optical elements by grinding and polishing process.

A still further object of the present invention is to provide a method of manufacturing optical elements by grinding and polishing molded glass products obtained by the above-described method.

SUMMARY OF THE INVENTION

The present invention relates to a method of manufacturing glass gobs from glass melt gobs in which glass melt gobs are molded and cooled in glass gob molding parts that are intermittently rotated to form glass gobs, characterized in that single intermittent rotation period of said glass gob molding part is not less than 0.1 second, and not more than 0.25 second, and the single intermittent rotation distance of said glass gob molding part is 0.8–7 cm (hereinafter referred to glass gobs manufacturing method (1)).

The present invention further relates to a method of manufacturing glass gobs from glass melt gobs in which glass melt gobs are molded and cooled in glass gob molding parts that are intermittently rotated to form glass gobs, characterized in that radius of said rotation is 20–40 cm and the number of said glass gob molding parts is 36–144 cm (hereinafter referred to glass gobs manufacturing method (2)).

The present invention still further relates to a method of manufacturing glass gobs from glass melt gobs in which glass melt gobs are molded and cooled in glass gob molding parts that are intermittently rotated to form glass gobs, characterized by the use of a device, on the circumference of which multiple glass gob molding parts are provided at equal intervals so that said multiple glass gob molding parts can be intermittently rotated along said circumference, in which glass gob molding molds equipped with multiple glass gob molding parts for receiving glass melt on an upper surface and molding into glass gobs are disposed so that the glass glob molding parts are disposed at equal intervals on said circumference (hereinafter referred to glass gobs manufacturing method (3)).

Further, the present invention relates to a glass glob molding device for molding glass gobs from a continuously flowing glass melt, having a turntable intermittently rotated around a rotation axis and glass gob molding molds positioned on said turntable, characterized in that said glass gob molding mold has multiple glass gob molding parts that receive glass melt on the upper surface thereof and mold the glass melt into glass gobs, and said glass gob molding mold is positioned on a turntable so that said glass gob molding parts are disposed at equal intervals around a circumference centered on the rotation axis of the turntable.

The present invention also relates to a method of manufacturing preforms for press-molding characterized in that glass gobs manufactured by the above-mentioned method according to the present invention are barrel polished.

In addition, the present invention relates to a method of manufacturing a molded glass article characterized in that the preform for press-molding manufactured by the above method according to the present invention is heated and press-molded to obtain a molded glass article.

Finally, the present invention relates to a method of manufacturing an optical element characterized in that a molded glass article manufactured by the above method according to the present invention is ground and polished to obtain an optical element.

The followings are the preferred embodiments of the present invention.

(1) In the glass gobs manufacturing methods (1) to (3), the glass melt gobs are formed by receiving flowing glass melt by glass gob molding parts which are sequentially delivered beneath the exit of melt glass flow continuously flowing, and one glass melt gob is formed per said single intermittent rotation period.

(2) In the glass gobs manufacturing methods (1) and (2), the methods employ a device in which multiple glass gob molding parts are disposed at equal intervals on the circumference and said multiple glass gob molding parts can be intermittently rotated along the above-mentioned circumference.

(3) The glass gobs manufacturing method (1) can be combined with the glass gobs manufacturing method (2), the glass gobs manufacturing method (2) can be combined with the glass gobs manufacturing method (3), as well as the glass gobs manufacturing method (1) can be combined with the glass gobs manufacturing method (3).

Figure 1:
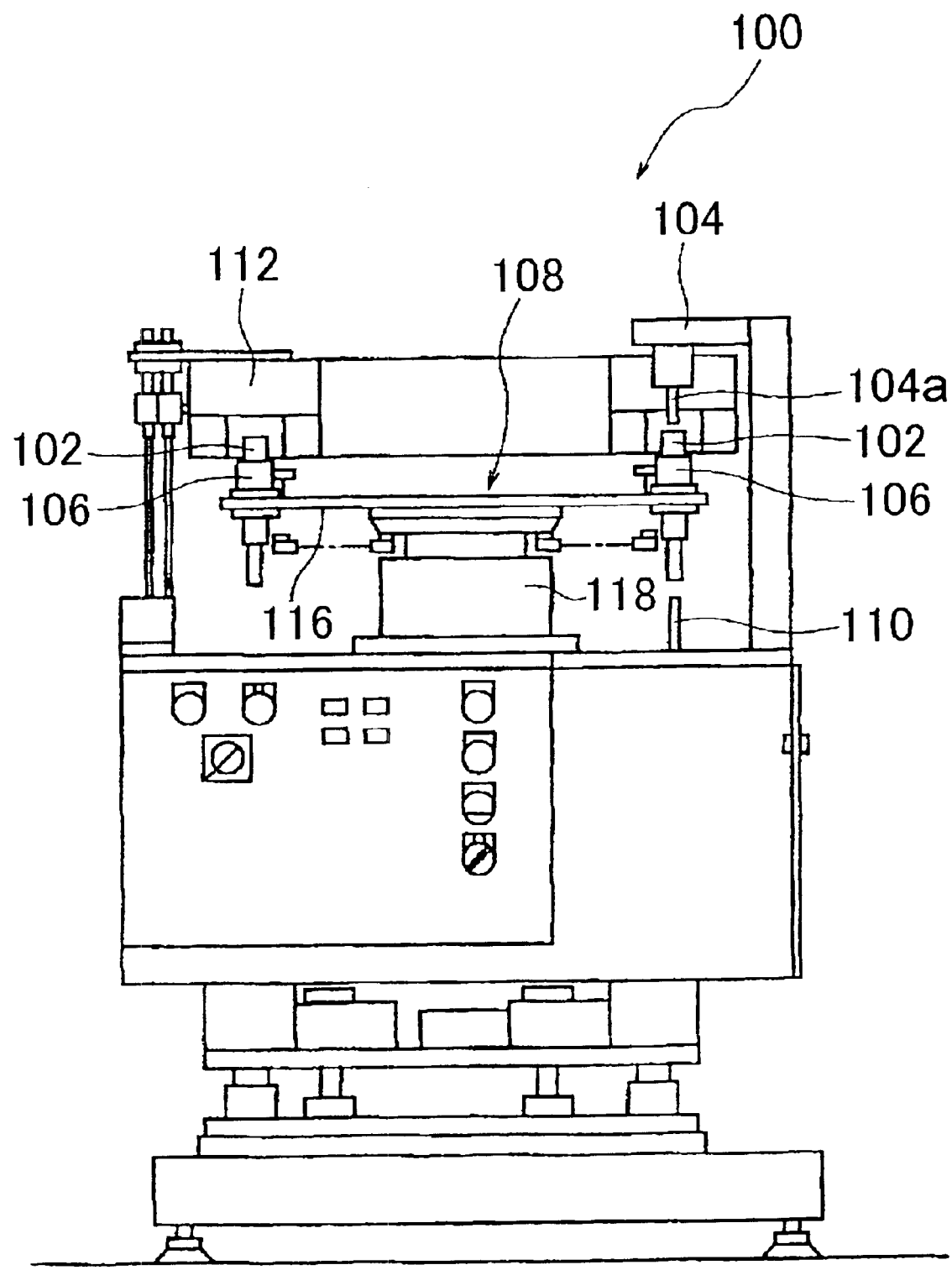
FIG. 1 is a lateral view of the glass gob-molding device of the present invention.

The invention is described more in detailed below.

The present invention is a method of manufacturing glass gobs from glass melt gobs. More particularly, it is a method of manufacturing glass gobs by molding and then cooling glass melt gobs in glass gob molding parts that are intermittently rotated. The glass gobs manufacturing method (1) of the present invention is characterized in that the single intermittent rotation period of the above-mentioned glass gob molding part is not less than 0.1 second and not more than 0.25 second, and the single intermittent rotation distance of the glass gob molding part is 0.8–7 cm.

As set forth above, in methods of manufacturing glass gobs, a glass melt is continuously discharged through a flow nozzle, and cast into glass melt gobs of prescribed weight on the receiving mold. The receiving molds are intermittently rotated, but when too much time is required for the receiving mold that has been supplied with a glass melt gob to be switched out with the next receiving mold, the glass melt falls from the flow nozzle somewhere other than on a receiving mold (between receiving molds). The fluidity of the glass melt varies with the type and temperature of the glass. Some adjustment is possible, but in practical terms, the viscosity of the glass melt falls within the range of about 2–30 poise. To continuously (intermittently) cast a glass melt with viscosity in this range onto the receiving mold without such failed casting, the time required for one intermittent rotation of the glass gob mold parts (receiving molds) is limited to not more than 0.25 seconds. The shorter the time required (delivery time) for one intermittent rotation of the glass gob molding parts (receiving molds), the less casting tends to fail. However, during such intermittent rotation, acceleration is exerted on the glass to be cast. Thus, when the delivery time is made too short, the acceleration exerted on the glass increases, the amount of deformation of the glass increases, and the glass does not recover when stopped, with distortion being produced. Accordingly, single intermittent rotation period of the glass gob molding parts (receiving molds) is not less than 0.1 second. Single intermittent rotation period of the glass gob molding parts (receiving molds) is preferably in a range of 0.15–0.2 seconds.

Further, single intermittent rotation distance of the glass gob molding parts falls within a range of 0.8–7 cm. The shorter the intermittent rotation distance, the smaller the acceleration that is exerted on the cast glass during intermittent rotation. However, single intermittent rotation distance cannot be smaller than the size of the glass gob. From this perspective, the minimum of the single intermittent rotation distance of the glass gob molding part is 0.8 cm. Further, when the intermittent rotation distance becomes larger, larger acceleration is exerted on the cast glass during intermittent rotation. The greater the size of the glass gob, the deformation becomes greater. In methods in which glass gobs are continuously manufactured from a flowing glass melt, the upper limit of the glass gobs that are manufactured is about 15 cm. Consequently, even for glass gobs of about this size, single intermittent rotation distance of the glass gob molding part of 7 cm is employed to prevent distortion from which recovery is impossible. Single intermittent rotation distance of the glass gob molding part preferably falls within the range of 1–4 cm.

The glass gobs manufacturing method (2) of the present invention is characterized in that the radius of circumferential rotation of the glass gob molding part is 20–40 cm and the number of glass gob molding parts is set to 36–144.

When the radius is small, the mechanical dimensions of the glass gob molding parts and the like also limit how close together the glass gob molding parts can be placed.

Accordingly, the radius is desirably set to not less than 20 cm. However, when the radius is excessively large, the turntable ends up bending, the weight becomes excessive, the moment of inertia of the turntable on which the glass gob molding molds are mounted becomes large, the load on the drive system of the turntable becomes large, and it becomes difficult to intermittently rotate the turntable at high speed. Further, as the radius increases, the number of glass gob molding molds increases. However, when the number of glass gob molding molds becomes too large, the time required to switch out molds during maintenance increases, operating properties decrease, the overall weight of the molding molds becomes excessive, and the load on the turntable drive system increases. Accordingly, the above-mentioned radius is desirably not greater than 40 cm. The preferred range of the radius is not less than 20 cm and not more than 30 cm.

In addition to setting the radius of the circumference on which the glass gob molding parts are disposed to within the above-stated range, the number of glass gob molding parts disposed at equal intervals on the circumference is set to 36–144. When the number of glass gob molding parts is small, the delivery distance increases and the acceleration exerted on the glass ends up increasing. By contrast, when this number is too large, it becomes impossible to dispose the glass gob molding parts on a circumference having a radius within the above-stated range. The number of glass gob molding parts is desirably even number, and preferably a multiple of 4.

The glass gobs manufacturing method (3) of the present invention is characterized by the use of a device, on the circumference of which multiple glass gob molding parts are provided at equal intervals so that said multiple glass gob molding parts can be intermittently rotated along said circumference, in which glass gob molding molds equipped with multiple glass gob molding parts for receiving glass melt on an upper surface and molding into glass gobs are disposed so that the glass glob molding parts are disposed at equal intervals on said circumference. This device is described in detail below.

The glass gob-molding device of the present invention comprises a turntable intermittently rotated around a rotation axis and glass gob-molding molds positioned on the turntable, and is used for molding glass gobs from a continuously flowing glass melt. The glass gob-molding mold has multiple glass gob molding parts that is used for receiving glass melt on their upper surfaces and for molding glass gobs. Further, the glass gob-molding mold is characterized in that the glass gob molding parts are positioned on the turntable so as to be disposed at equal intervals on a circumference centered on the rotation axis of the turntable. Further, for the same reasons as in the glass gobs manufacturing method (2) of the present invention, in this device, the radius of the circumference is preferably 20–40 cm and the number of the above-mentioned glass gob molding parts is preferably 36–144.

This device and methods of manufacturing glass gobs employing this device will be further described below.

FIG. 1 is a lateral view of a glass gob-molding device 100. In the figure, numeral 104 denotes a glass melt supply element continuously supplying a glass melt, and 104a denotes a flow nozzle out of which glass gobs flow. The upper portion of the glass melt supply element is linked to a stirring tank, a clarifying tank, and a glass-melting tank. A melted, clarified, and homogenized glass melt is continuously sent to glass melt supply element 104. The temperature of glass melt supply element 104, including flow nozzle 104a, is controlled so that the temperature of the glass melt remains constant. Numeral 102 denotes a glass gob-molding mold on which are positioned glass gob molding parts that receive glass melt and mold it into glass gobs. Numeral 106 denotes a holding member holding the glass gob-molding mold. The present device is equipped with multiple glass gob molding molds 102. Glass gob molding molds 102 are disposed on a turntable 116 of lightweight and strong aluminum alloy. Turntable 116 is driven to rotate intermittently as is described further below by a direct drive motor 118. The temperature of glass gob molding molds 102 is adjusted by a heating furnace 112 to a temperature suited to the molding of glass gobs. Further, the glass gobs under molding by glass gob molding mold 102 are gradually cooled in heating furnace 112 prior to being removed therefrom. Numeral 108 denotes a glass gob molding mold conveyor element comprised of turntable 116, direct drive motor 118, and the like.

The manner in which glass gobs are molded by this device will be described next. To mold glass gobs of prescribed weight from glass melt, clarified and homogenized glass melt flows continuously and at constant speed from a glass melt flow pipe. The flowing glass melt is received successively by multiple glass gob molding molds 102 equipped with glass gob molding parts and molded into glass gobs, for example, in the shape of marbles. The multiple glass gob molding molds 102 sequentially receive the glass melt (referred to hereinafter as "casting"), mold glass gobs, and remove the glass gobs from the glass gob molding molds 102 (referred to hereinafter as "takeout"). Following takeout, they return to the casting step and are recirculated. Such a delivery of glass gob molding molds 102 is conducted by intermittently rotating the turntable so that the glass gob molding parts of glass gob molding molds 102 are disposed on turntable 116 at equal intervals on a single circumference centered about the rotation axis of the turntable.

Figure 2:
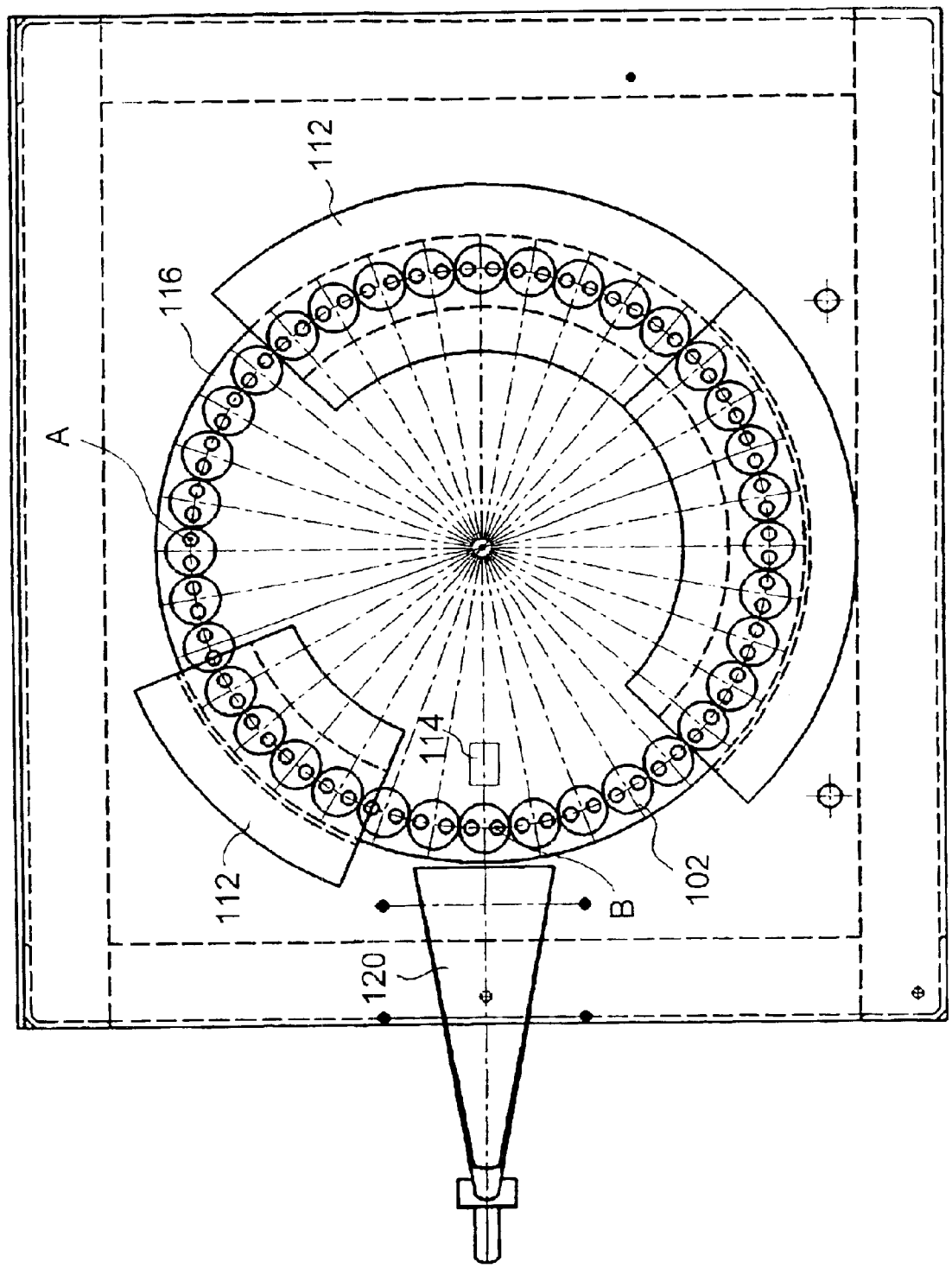
FIG. 2 is a schematic plane view of the glass gob-molding device of the present invention.

FIG. 2 is a plane view of the molding device 100 shown in FIG. 1. A denotes the casting position and B denotes the takeout position. Takeout is performed by blowing a glass melt arriving at position B away to a fan-shaped glass gob collection part 120 by a gas from a takeout means 114. As shown in FIG. 2, 36 glass gob molding molds 102 are disposed at equal intervals around the rotational center of turntable 116; the multiple glass gob molding parts provided on each of glass gob molding molds 102 are disposed at equal intervals around the rotational center of turntable 116. For example, when two glass gob-molding parts are provided on the upper surface of each molding mold, device 100 is comprised of 72 sections, with each section being disposed at a spacing of 5°. Casting and takeout are conducted while the glass gob molding parts are stopped at positions A and B.

Since the glass melt flows continuously at constant prescribed speed, production of large quantities of glass gobs of prescribed weight with good production properties can be established by setting to a prescribed value the time interval (referred to hereinafter as the "cutting time") at which the front end portion of the downward glass melt flow is cut or separated. The cutting time corresponds to the time for the glass gob molding part to arrive at the casting position, for casting to take place, for conveyance from the casting position following casting, and for the next glass gob molding part to arrive at the above casting position. On this basis, the glass gob molding parts move in increments of one section at a time. In the description given below, the weight of the glass melt that flows down from the flow pipe each day, that is, the draw quantity, is used to denote the amount of flow of glass melt per unit of time. For a given draw quantity, the cutting time determines not only the weight of the glass gobs, but also the number of glass gobs produced per unit time. Hereinafter, the number of glass gobs produced per minute will be expressed in units of DPM.

As set forth above, from casting to takeout, the glass on the glass molding parts is subjected to acceleration during acceleration and deceleration by intermittent rotation of the turntable. In the present mode, the number of sections can be increased so that movement over one section more closely resembles linear motion, not rotational motion. As will be described further below based on FIG. 3, the glass gob molding parts are comprised of, for example, concave depressions in which multiple outlets from which gas blows out are provided. Glass gobs are molded while floating the cast glass by means of pressure caused by gas blown out from the gas outlets. When acceleration is exerted on glass gobs during molding in this fashion, the glass significantly deviates from the center position of the glass gob molding parts or extends resulting in deformation. Since the greater the weight of the glass, the greater the force exerted on the glass by acceleration, this deformation becomes significant. Since this acceleration disappears when the turntable intermittently stops, the plastically deformable glass tends to return to a glass gob shape such as that of a marble. At that time, glass that has been greatly deformed is distorted. Further, glass is deformed by being pressed with a glass gob molding part with considerable force, or contacting parts of the glass are suddenly cooled, thereby compromising the appearance, such as developing fine cracks called as crizzle. Accordingly, the acceleration caused by intermittent rotation of the turntable must be reduced while maintaining production efficiency.

Once the draw quantity and the weight of the glass gobs have been determined in the manner set forth above, the cutting time cannot be changed. Accordingly, to reduce acceleration, it is necessary to shorten the distance over which the glass gob molding parts move in one section (this is referred to as the "delivery distance" below; the delivery distance corresponds to the distance in which the glass gob molding part moves during the delivery time set for control). Accordingly, acceleration can be reduced by disposing as many glass gob molding parts as possible at equal intervals on the circumference to shorten the interval of the glass gob molding parts, that is, to shorten the delivery distance.

In consideration of these points, as set forth above, in the glass gobs manufacturing method (1) of the present invention, the single intermittent circumference rotation period of the glass gob molding part was set to not less than 0.1 second and not more than 0.25 second, and the single intermittent circumference rotation distance was set to 0.8–7 cm. As set forth above, in the glass gobs manufacturing method (2) of present invention, the radius of circumferential rotation was set to 20–40 cm and the number of glass gob molding parts was set to 36–144.

By increasing the number of glass gob molding parts, that is, the number of sections, on the turntable, the glass gobs can be adequately cooled prior to takeout. It suffices to increase the number of sections from the casting position to the takeout position in order to lengthen the time from casting to takeout in a manner adequate for cooling without changing the cutting time. Since increasing the number of sections on the turntable also increases the number of sections from the casting position to the takeout position, the glass gobs can adequately cool prior to takeout. In addition to increasing the number of sections on the turntable, it is desirable to cool the positions between casting and takeout to a temperature at which glass gobs are not plastically deformed during takeout. Specifically, it is desirable for the temperature of the glass gobs at takeout to be at or below the glass transition temperature. When the temperature of the glass gobs is high, they stick together following takeout and are deformed by force exerted during takeout. Such problems can be avoided by taking out the glass gobs after they have been adequately cooled.

When separating the front portion of the glass melt flow at the casting position, a method called drop cutting is employed. In this method, the glass gob molding part is positioned in proximity to the end of the flow pipe, the end portion of the glass melt flow is received, and the glass gob molding part is dropped at a speed substantially more rapid than the glass melt flow speed to separate the glass. In this method, the glass glob molding part is moved vertically at the casting position. Accordingly, a mechanism for this purpose is required. Not only must glass gob molding molds equipped with glass gob molding parts be mounted on the turntable, but a mechanism supporting the glass gob molding molds must also be provided. Thus, the space occupied by a glass gob molding mold becomes larger than that occupied by a glass gob molding part, preventing the glass gob molding parts from disposing on the circumference at narrow intervals. Accordingly, in the device employed in the glass gobs manufacturing method (3) of the present invention and the glass gob molding device of the present invention, multiple glass gob molding parts are positioned on the upper surface of the glass gob molding mold, and multiple molding molds of this type are disposed on the turntable so that the glass gob molding parts are disposed on the circumference at equal intervals. Within the range over which the glass gob molding parts on the upper surface of the glass gob molding molds are positioned, identical glass gob molding molds are preferably disposed at equal intervals on the turntable on a circumference centered around the rotation axis, and the glass gob molding parts are preferably disposed on that circumference. Further, the number of glass gob molding parts positioned on a single glass gob molding mold is desirably two or three, with two being particularly preferred. Such a glass gob molding mold permits a narrow interval between glass gob molding parts and can reduce acceleration exerted on the glass during intermittent rotation.

Figure 3:
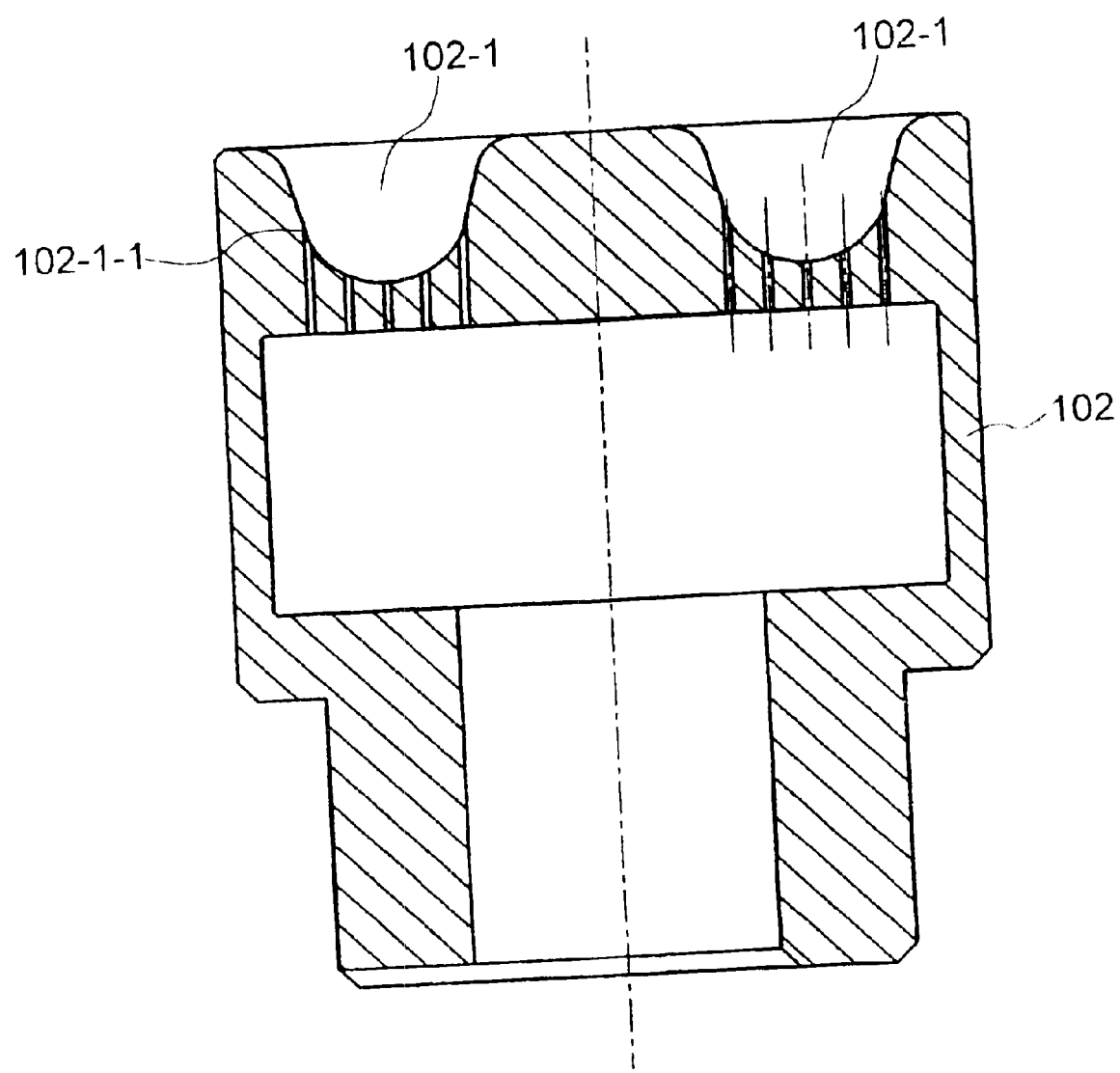
FIG. 3 is a cross-sectional view of a glass gob-molding mold employed in the glass gob molding device of the present invention.

FIG. 3 shows a cross-sectional view of glass gob molding mold 102. The mold made of carbon or stainless steel is desirable because of high strength and lightweight to permit rapid driving. Two concave glass gob-molding parts 102-1 are provided on the upper surface of the glass gob molding mold, with multiple blowing gas outlets 102-1-1 being provided on each of the molding surfaces. Gas such as air or nitrogen is blown through the gas outlets to exert gas pressure on the glass on the glass gob molding part. This gas pressure causes the glass melt gob to float and assume a shape, becoming a glass gob. As previously described, when separating the front end portion of the glass melt flow by drop cutting, the glass gob molding mold is raised to bring it in proximity to the flow pipe when the glass gob molding part reaches the casting position, and once the glass gob molding part has received the front end portion of the glass melt flow, the glass gob molding mold is lowered to receive glass of a prescribed weight on the glass gob molding part. Casting is conducted while the glass gob molding part is stopped at the casting position. The quantity of gas blown out when the glass gob molding part is in proximity to the flow nozzle is desirably reduced so as to prevent the glass melt from wetting and clinging to the flow pipe due to the gas being blown out through the gas outlets during raising of the glass gob molding mold. When casting into one of the two glass gob molding parts of the glass gob molding mold has been completed, the turntable is intermittently rotated, and the glass gob molding mold is moved so that the other glass gob molding part is brought to the casting position. When casting into this glass gob molding part has been similarly completed, the glass gob molding mold is moved completely away from the casting position and a glass gob molding part of the next glass gob molding mold is moved into the casting position. Switching of the amount of gas being blown during rising of the glass gob molding mold may be conducted for each glass gob molding mold or for each glass gob molding part. However, when conducting switching for each glass gob-molding mold, casting of the second glass gob molding part is conducted while a glass is being cast in the first glass gob molding part. Accordingly, the amount of gas being blown is adjusted downward so as not to generate imperfections in the glass being cast in the first glass gob molding part.

The above-described method of reducing the acceleration exerted on the glass during glass gob molding is particularly effective under conditions of manufacturing glass gobs with high production efficiency. Thus, the draw quantity is desirably set to within a range of not less than 80 kg/day and not more than 200 kg/day and the cutting time is desirably set to not more than 0.1 second and not less than 0.25 second, preferably 0.15–0.2 second. The above draw quantity converted to a glass melt flow down rate per minute is 55–139 g/min. The above draw quantity converted to a glass melt flow out speed range is 4.5–10.5 cm/s.

The viscosity of the glass melt flowing down from the flow nozzle is desirably adjusted to within a range of 2–30 poise, preferably 2–20 poise, by controlling the temperature of the glass melt supply element.

By setting the radius of the circumference over which the glass gob molding parts are disposed, the number of glass gob molding parts (number of sections), and the cutting time to the above-stated ranges, it is possible to keep the maximum acceleration exerted on the glass during glass gob molding within a desirable range of 3.14–9.4 m/s (excluding the gravitational acceleration component).

The glass gobs manufacturing methods of the present invention is suited to the production of comparatively light glass gobs weighing 0.3 g, to comparatively heavy glass gobs weighing 30 g. In particular, by reducing the acceleration exerted on the glass during glass gob molding, comparatively heavy glass gobs ranging from 2.0–30 g in weight can be molded well without defects such as distortion. In conventional methods in which the cooling of glass gobs of greater weight is difficult and it is impossible to keep adequate time from casting to takeout, the glass gobs deform after takeout, glass gob adhesion sometimes occurs. However, by increasing the number of sections, an adequate cooling time can be achieved between casting and takeout, even in efficient production at a DPM of 150–180 at a comparatively light weight of 0.3–0.8 g.

Glass gobs manufactured by any of the manufacturing methods (1) to (3) of the present invention mentioned above can be made into preforms for press-molding by subjecting them to barrel polishing. Specifically, glass gobs molded from glass melt are annealed and then barrel polished to roughen the surface thereof to obtain a preform for press-molding. Barrel polishing can be conducted by the usual methods. Further, series of processes for manufacturing preforms for press-molding from melt glass to can be conducted in an air atmosphere.

Further, the preform for press-molding manufactured by the above-described method can be heated and press-molded to obtain a molded glass article. In this process, the surface of the preform for press-molding is coated with a powder mold releasing agent such as boron nitride as necessary. The preform for press-molding is reheated to achieve a viscosity permitting press-molding—for example, $10^{4-106}$ poise —and press-molded in a press molding mold to obtain a press-molded article. In this process, the temperature of the press-molding mold is desirably adjusted in advance to 600–750° C. The usual methods of press-molding and known press molding molds may be employed.

Molded glass articles manufactured by the above-described method may be ground and polished to obtain optical elements. That is, the surfaces of press-molded articles may be ground and polished to finish final products such as various optical elements in the form of various prisms and lenses such as convex lenses, concave lenses, and meniscus lenses. In press-molding methods for obtaining a final product by manufacturing a press-molded product approximating the shape of the final product and finishing this product by grinding and polishing, series of the processes of reheating and press-molding can be conducted in an air atmosphere.

Glass gobs manufactured by any of the glass gobs manufacturing methods (1) to (3) of the present invention can be employed as preforms for precision press-molding without barrel polishing. In precision press-molding, the reheating and press-molding with a press molding mold of the glass glob are desirably conducted in a non-oxidizing atmosphere such as a nitrogen atmosphere. Further, the viscosity of the glass during press-molding is desirably about 108 poise. In precision press-molding, the shape of the molding surface of the press molding mold is precisely transferred to the glass. Molded glass articles of high shape precision, such as optical elements, can be obtained following press-molding even without grinding and polishing the glass.

Any stabilized glass flowing regularly out of the flow nozzle that does not lose transparency during casting or molding can be employed in the practice of the manufacturing methods and device of the present invention. When employing drop cutting, any glass that can be separated well without leaving behind filaments during drop cutting may be employed. Examples of glasses satisfying these conditions are various optical glasses such as $SiO_2$—$TiO_2$ and $B_2O_3$—$ZnO$—$La_2O_3$ optical glasses.

EXAMPLES

The present invention is further described below through examples.

Examples 1–5, Comparative Example 1–5

Glass melts of both $B_2O_3$—$ZnO$—$La_2O_3$ and $SiO_2$—$TiO_2$ optical glasses were prepared. In air, these glass melts were made to continuously flow from platinum-alloy flow nozzles, the glass melts were sequentially received by glass gob molding parts positioned on the upper surface of glass gob molding molds made of carbon, and the glass melts were floated and molded to obtain glass gobs. The viscosity of the glass melts during flowing was 10 poise for the $B_2O_3$—$ZnO$—$La_2O_3$ optical glass and 5 poise for the $SiO_2$—$TiO_2$ optical glass. The glass glob molding device shown in FIG. 1 was employed in Examples 1 and 2.

In Example 1, glass gobs were molded from a glass melt obtained from $B_2O_3$—ZnO—$La_2O_3$ optical glass, and in Example 2, glass gobs were molded from a glass melt obtained from $SiO_2$—$TiO_2$ optical glass. In Examples 1 and 2, 36 glass gob molding molds each equipped on its upper surface with two glass gob molding parts were employed, yielding a total number of glass gob molding parts, or sections, of 72 (the single intermittent rotation distance of the glass gob molding parts was 2.2 cm). In Example 1, glass gobs were generated at a production speed of 36 DPM, and in Example 2, at a production speed of 173 DPM, both without defects such as distortions or veins.

By contrast, in Comparative Example 1, glass gobs were molded by the prior art method from a glass melt for obtaining $B_2O_3$—ZnO—$La_2O_3$ optical glass at the same speed as in Example 1. In Comparative Example 1, 36 glass gob molding molds each equipped with a single glass gob molding part were employed, and the turntable was rotated once through 36 sections (the single intermittent rotation distance of the glass gob molding parts was 4.4 cm). The distance between the center of rotation of the turntable and the center of each of the glass gob molding parts was 25 cm in both Example 1 and Comparative Example 1. When glass gobs were molded under these conditions, defects such as distortion and veins were produced in the glass gobs and the yield dropped.

In Comparative Example 2, glass gobs were molded by the prior art method from a glass melt for obtaining $SiO_2$—$TiO_2$ optical glass. In Comparative Example 2, 36 glass gob molding molds each equipped with a single glass gob molding part were employed, and the turntable was rotated once through 36 sections (the single intermittent rotation distance of the glass gob molding parts was 4.4 cm). The distance between the center of rotation of the turntable and the center of each of the glass gob molding parts was 25 cm in both Example 2 and Comparative Example 2. When glass gobs were molded under these conditions, the glass gobs adhered together following takeout because they had not adequately cooled during takeout.

Similarly, when molded under the conditions given in Table 1 in Examples 3–5, it proved possible to manufacture good glass gobs. However, when molded under the conditions indicated for Comparative Examples 3–5, good glass gobs could not be manufactured. (In Example 5 and Comparative Example 5, the single intermittent rotation distances of the glass gob molding parts were 2.2 and 4.4 cm, respectively.)

Although defects such as distortion and veins were produced and the glass gobs adhered together in molding by the conventional method, good marble-shaped glass gobs could be molded at weights of 0.4–2.5 g in the present examples.

TABLE 1

| | Total no. of glass gob molding parts | No. of glass gob molding molds | Glass | Radius of glass gob molding part disposition (cm) | Table acceleration ($m/s^2$) | Delivery time(s) | Weight of glass gob (g) | Draw quantity (kg/day) | DPM | Quality of glass gobs |
|---|---|---|---|---|---|---|---|---|---|---|
| Ex. 1 | 72 | 36 | $B_2O_3$—ZnO—$La_2O_3$ based | 25 | 3.9 | 0.17 | 2.5 | 130 | 36 | Good |
| Ex. 2 | 72 | 36 | $SiO_2$—$TiO_2$ based | 25 | 3.9 | 0.17 | 0.4 | 100 | 173 | Good |
| Ex. 3 | 72 | 36 | $B_2O_3$—ZnO—$La_2O_3$ based | 25 | 3.9 | 0.17 | 2.5 | 130 | 36 | Good |
| Ex. 4 | 72 | 36 | $SiO_2$—$TiO_2$ based | 25 | 3.9 | 0.17 | 0.4 | 100 | 173 | Good |
| Ex. 5 | 144 | 72 | $SiO_2$—$TiO_2$ based | 50 | 3.9 | 0.17 | 0.45 | 100 | 155 | Good |
| Comp. Ex. 1 | 36 | 36 | $B_2O_3$—ZnO—$La_2O_3$ based | 25 | 7.8 | 0.17 | 2.5 | 130 | 36 | Occurrence of distortion and veins |
| Comp. Ex. 2 | 36 | 36 | $SiO_2$—$TiO_2$ based | 25 | 7.8 | 0.17 | 0.4 | 100 | 173 | Gobs adhered together |
| Comp. Ex. 3 | 36 | 36 | $B_2O_3$—ZnO—$La_2O_3$ based | 25 | 7.8 | 0.17 | 2.5 | 130 | 36 | Occurrence of distortion and veins |
| Comp. Ex. 4 | 36 | 36 | $SiO_2$—$TiO_2$ based | 25 | 7.8 | 0.17 | 0.4 | 100 | 173 | Gobs adhered together |
| Comp. Ex. 5 | 72 | 72 | $SiO_2$—$TiO_2$ based | 50 | 7.8 | 0.17 | 2.7 | 100 | 155 | Occurrence of distortion and veins |

The "table acceleration" in the above table corresponds to the maximum acceleration during acceleration and deceleration. Relative to the maximum acceleration during acceleration and deceleration, the acceleration corresponding to centrifugal force is so small as to be negligible.

Example 6

The glass gobs obtained in Examples 1–5 were further annealed in air and then cooled to room temperature. The glass gobs were then barrel polished to uniformly roughen the surfaces and employed as preforms for press-molding. The preforms for press-molding were uniformly coated with a boron nitride powder mold releasing agent, heated in air to within a temperature range yielding a glass viscosity of $10^{4-106}$ poise, and employed in press-molding using a metal mold made of an super-hard alloy, yielding the desired final product in the form of a lens blank approximating the shape of a meniscus lens. This lens blank was then ground and polished to finish a meniscus lens.

Through suitable selection of the shape of the molding surface of the metal mold, it is possible to press-mold the blanks of other lenses, as well as the blanks of optical elements such as prisms other than lenses. These blanks can then be ground and polished to obtain final products.

It is also possible to form thin optical films as needed on final products that are optical elements.

Example 7

A glass melt yielding optical glass with a yield point of not more than 600° C. was prepared and glass gobs were molded using the glass gob molding device of Example 1. The glass gobs obtained were annealed and cooled to room temperature. All processing up to this point was conducted in air. Next, in a nitrogen atmosphere, the glass gobs were heated to a temperature yielding a glass viscosity of about $10^8$ poise and the heat-softened glass was precision press-molded in a nitrogen atmosphere using a press-molding mold to precisely transfer the molding surface of the press-molding mold to the glass. Aspherical lenses were obtained by this method. By such a precision press-molding, optical elements such as aspherical lenses without grinding and polishing steps following press-molding.

Thin optical films can be formed as necessary on the optical elements obtained.

The present invention as set forth above provides a method of manufacturing glass gobs with high productivity without defects in appearance from a glass melt, and a device for molding glass gobs.

Also provided are a manufacturing method in which these glass gobs are employed as preforms for press-molding to manufacture molded glass articles for manufacturing press-molding product of optical elements such as lenses and the like, and optical elements in the form of final products obtained by grinding and polishing these molded glass articles.

The present disclosure relates to the subject matter contained in Japanese Patent Application No. 2001-134092 filed on May 1, 2001, which is expressly incorporated herein by reference in its entirety.

What is claimed is:

1. A method of manufacturing glass gobs from glass melt gobs, comprising:
    molding and cooling glass melt gobs in glass gob molding parts; and
    intermittently rotating the glass gob molding parts to form glass gobs, a single intermittent rotation period of said glass gob molding parts being not less than 0.1 second and not more than 0.25 second, a single intermittent rotation distance of said glass gob molding parts being 0.8–7 cm.

2. A method of manufacturing glass gobs from glass melt gobs, comprising:
    molding and cooling glass melt gobs in glass gob molding parts; and
    intermittently rotating the glass gob molding parts to form glass gobs, a radius of said rotation being 20–40 cm and a number of said glass gob molding parts being 36–44.

3. The method according to claim 1, further comprising:
    providing a device with a circumference on which the glass gob molding parts are provided at equal intervals so that said glass gob molding parts are intermittently rotated along the circumference.

4. The method according to claim 2, further comprising
    providing a device with a circumference on which the glass gob molding parts are provided at equal intervals so that said glass gob molding parts are intermittently rotated along the circumference.

5. The method according to claim 1, wherein a number of said glass gob molding parts is 36–144.

6. The method according to claim 3, wherein the number of said glass gob molding parts is 36–144.

7. The method according to claim 1, further comprising:
    selecting positions of casting and takeout of glass gobs so that the glass gobs are cooled to a temperature at which glass gobs are not plastically deformed.

8. The method according to claim 2, further comprising:
    selecting positions of casting and takeout of glass gobs so that the glass gobs are cooled to a temperature at which glass gobs are not plastically deformed.

9. The method according to claim 1, further comprising:
    receiving flowing glass melt by the glass gob molding parts to form the glass melt gobs, the glass gob molding parts being sequentially delivered beneath an exit of melt glass flow continuously flowing, one glass melt gob being formed per said single intermittent rotation period.

10. The method according to claim 2, further comprising:
    receiving flowing glass melt by the glass gob molding parts to form the lass melt gobs, the glass gob molding parts being sequentially delivered beneath an exit of melt glass flow continuously flowing, one glass melt gob being formed per a single intermittent rotation period of said glass gob molding part.

11. A method of manufacturing a preform for press-molding, comprising:
    barrel polishing glass gobs manufactured by the method according to claim 1.

12. A method of manufacturing a preform for press-molding, comprising:
    barrel polishing glass gobs manufactured by the method according to claim 2.

13. A method of manufacturing a molded glass article, comprising:
    heating and press-molding a preform for press-molding manufactured by the method according to claim 11 to obtain a molded glass article.

14. A method of manufacturing a molded glass article, comprising:
    heating and press-molding a preform for press-molding manufactured by the method according to claim 12 to obtain a molded glass article.

15. A method of manufacturing an optical element, comprising:
    grounding and polishing a molded glass article manufactured by the method according to claim 13 to obtain an optical element.

16. A method of manufacturing an optical element, comprising:
    grounding and polishing a molded glass article manufactured by the method according to claim 14 to obtain an optical element.

* * * * *